| (12) | United States Patent | (10) Patent No.: | US 9,194,960 B2 |
|---|---|---|---|
| | Gagnon et al. | (45) Date of Patent: | Nov. 24, 2015 |

(54) PET DETECTOR SCINTILLATION LIGHT GUIDING SYSTEM HAVING FIBER-OPTICS PLATES

(75) Inventors: Daniel Gagnon, Twinsburg, OH (US); Kent Burr, Buffalo Grove, IL (US)

(73) Assignees: KABUSHIKI KAISHA TOSHIBA, Tokyo (JP); TOSHIBA MEDICAL SYSTEMS CORPORATION, Otawara-shi (JP)

( * ) Notice: Subject to any disclaimer, the term of this patent is extended or adjusted under 35 U.S.C. 154(b) by 0 days.

(21) Appl. No.: 13/545,614

(22) Filed: Jul. 10, 2012

(65) Prior Publication Data

US 2012/0281956 A1   Nov. 8, 2012

Related U.S. Application Data

(62) Division of application No. 12/907,124, filed on Oct. 19, 2010, now Pat. No. 8,304,738.

(51) Int. Cl.

| G01T 1/20 | (2006.01) |
|---|---|
| G02B 6/06 | (2006.01) |
| G02B 6/08 | (2006.01) |
| G01T 1/164 | (2006.01) |

(52) U.S. Cl.
CPC ............ *G01T 1/1644* (2013.01); *G01T 1/2006* (2013.01); *G01T 1/2018* (2013.01); *G02B 6/06* (2013.01); *G02B 6/08* (2013.01)

(58) Field of Classification Search
CPC ......... G02B 6/08; G02B 6/065; H01J 29/892; C02B 2203/40; C02B 2203/42; Y10S 348/902; G01T 1/1644
USPC ........................................................ 385/120
See application file for complete search history.

(56) References Cited

U.S. PATENT DOCUMENTS

| 3,554,720 | A | * | 1/1971 | Crepet ............................ 65/410 |
| 4,385,092 | A | * | 5/1983 | Singer, Jr. ..................... 428/188 |
| 4,532,171 | A | * | 7/1985 | Balkwill ....................... 428/188 |
| 4,563,582 | A | | 1/1986 | Mullani |

(Continued)

FOREIGN PATENT DOCUMENTS

| JP | 58-37603 | | 3/1983 |
| JP | 05019356 A | * | 1/1993 |
| WO | WO 2009/072072 A1 | | 6/2009 |
| WO | WO 2010/033141 A1 | | 3/2010 |

OTHER PUBLICATIONS

Igarashi et al. (JP 05-019356 A), Machine Translation, Jan. 29, 1993.*

(Continued)

*Primary Examiner* — Michelle R Connelly
(74) *Attorney, Agent, or Firm* — Oblon, McClelland, Maier & Neustadt, L.L.P.

(57) ABSTRACT

A positron emission tomography scanner system that includes detector modules arranged adjacent to one another to form a cylindrical detector ring. Each of the detector modules includes an array of scintillation crystal elements, a plurality of photosensors arranged to cover the array of crystal elements and configured to receive light emitted from the array of crystal elements, and a fiber optics plate arranged between the array of scintillation crystal elements and the plurality of photosensors, the fiber optics plate including a plurality of fibers configured to guide the light emitted from the scintillation crystal to the plurality of photosensors.

8 Claims, 8 Drawing Sheets

(56) References Cited

U.S. PATENT DOCUMENTS

| | | | |
|---|---|---|---|
| 4,849,000 A * | 7/1989 | Patrick | 65/393 |
| 5,319,204 A | 6/1994 | Wong | |
| 5,420,959 A * | 5/1995 | Walker et al. | 385/143 |
| 5,453,623 A | 9/1995 | Wong et al. | |
| 6,552,348 B2 * | 4/2003 | Cherry et al. | 250/363.03 |
| 7,835,782 B2 * | 11/2010 | Cherry et al. | 600/411 |
| 2004/0252955 A1 | 12/2004 | Kajiwara et al. | |
| 2005/0072904 A1 | 4/2005 | Aykac et al. | |
| 2005/0276566 A1 * | 12/2005 | Iimura | 385/146 |
| 2006/0093292 A1 * | 5/2006 | Biegelsen | 385/120 |
| 2006/0278947 A1 | 12/2006 | Noda | |
| 2007/0085016 A1 | 4/2007 | Schulz | |
| 2009/0302228 A1 * | 12/2009 | Hadjioannou et al. | 250/370.08 |
| 2011/0024634 A1 | 2/2011 | Shah et al. | |

OTHER PUBLICATIONS

M.E. Casey, et al., "A Multicrystal Two Dimensional BGO Detector System for Positron Emission Tomography," Computer Technology and Imaging 215 Center Park Drive Knoxville, Tennessee, IEEE Transactions on Nuclear Science, vol. 33, No. 1, Feb. 1986, p. 460-463.

Chang L. Kim, et al., "High Spatial Resolution Detector using an 8×8 MLS crystal array and a Quad Anode Photo-multiplier," IEEE Medical Imaging Conference, Conference Record, M11-050, Norfolk, Virginal, Nov. 2002, pp. (5).

S. Surti, et al. "Optimizing the Performance of a PET Detector using Discrete GSO Crystals on a Continuous Lightguide," IEEE Transactions on Nuclear Science, vol. 47, No. 3, Jun. 2000, p. (1030-1036).

* cited by examiner

PET DETECTOR SCINTILLATION LIGHT GUIDING SYSTEM HAVING FIBER-OPTICS PLATES

CROSS-REFERENCE TO RELATED APPLICATIONS

The present application is a divisional application of U.S. patent Ser. No. 12/907,124, filed Oct. 19, 2010, the entire contents of which are incorporated herein by reference.

FIELD

Embodiments described herein relate generally to the design of radiation detectors, such as for gamma cameras and positron emission tomography scanners.

BACKGROUND

The use of gamma ray detectors in general, and positron emission tomography (PET) in particular, is growing in the field of medical imaging. In PET imaging, a radiopharmaceutical agent is introduced into an object to be imaged via injection, inhalation, or ingestion. After administration of the radiopharmaceutical, the physical and bio-molecular properties of the agent will cause it to concentrate at specific locations in the human body. The actual spatial distribution of the agent, the intensity of the region of accumulation of the agent, and the kinetics of the process from administration to its eventual elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are destroyed. Most of the time, an annihilation event produces two gamma rays (at 511 keV) traveling at substantially 180 degrees apart.

By detecting the two gamma rays, and drawing a line between their locations, i.e., the line-of-response (LOR), one can retrieve the likely location of the original disintegration. While this process will only identify a line of possible interaction, by accumulating a large number of those lines, and through a tomographic reconstruction process, the original distribution can be estimated. In addition to the location of the two scintillation events, if accurate timing (within few hundred picoseconds) is available, a time-of-flight (TOF) calculation can add more information regarding the likely position of the event along the line. Limitations in the timing resolution of the scanner will determine the accuracy of the positioning along this line. Limitations in the determination of the location of the original scintillation events will determine the ultimate spatial resolution of the scanner, while the specific characteristics of the isotope (e.g., energy of the positron) will also contribute (via positron range and co-linearity of the two gamma rays) to the determination of the spatial resolution the specific agent.

The above described detection process must be repeated for a large number of annihilation events. While each imaging case must be analyzed to determine how many counts (i.e., paired events) are required to support the imaging task, current practice dictates that a typical 100-cm long, $^{18}$FDG (fluoro-deoxyglucose) study will need to accumulate several hundred million counts. The time required to accumulate this number of counts is determined by the injected dose of the agent and the sensitivity and counting capacity of the scanner.

PET imaging systems use detectors positioned across from one another to detect the gamma rays emitting from the object. Typically a ring of detectors is used in order to detect gamma rays coming from each angle. Thus, a PET scanner is typically substantially cylindrical to be able to capture as much radiation as possible, which should be, by definition, isotropic.

Figure 6:
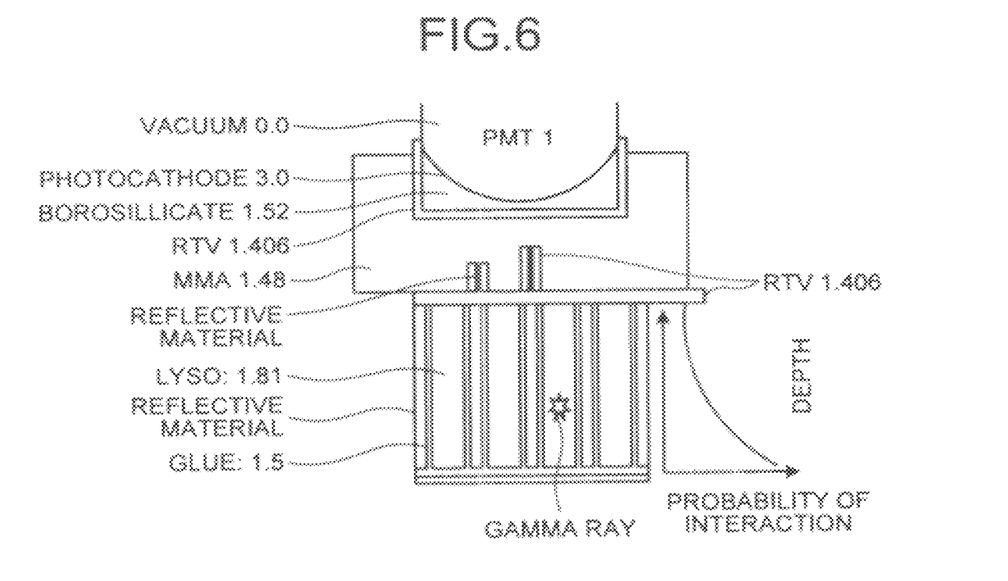
FIG. 6 illustrates the optical path from scintillation in a LYSO crystal to the photocathode of a PMT.

Once the overall geometry of the PET scanner is known, another challenge is to arrange as much scintillating material as possible in the gamma ray paths to stop and convert as many gamma rays as possible into light. In order to be able to reconstruct the spatio-temporal distribution of the radio-isotope via tomographic reconstruction principles, each detected event will need to be characterized for its energy (i.e., amount of light generated), its location, and its timing. Most modern PET scanners are composed of several thousand individual crystals, which are arranged in modules and are used to identify the position of the scintillation event. Typically crystal elements have a cross section of roughly 4 mm×4 mm. Smaller or larger dimensions and non-square sections are also possible. The length or depth of the crystal will determine how likely the gamma ray will be captured, and typically ranges from 10 to 30 mm. One example of a scintillation crystal is LYSO (or $Lu_{1.8}Y_{0.2}SiO_5$:Ce or Lutetium Orthosilicate), which is chosen for its high light output, fast rise time, fast decay time, high average atomic number, and high density. Other crystals can be used. FIG. 6 illustrates the optical path from scintillation in a LYSO crystal to the photocathode of a PMT.

PET imaging relies on the conversion of gamma rays into light through fast and bright scintillation crystals. After determining the interaction position in the scintillator and time pairing of individual events, the location of the annihilation process can be recreated. These actions require very fast components—detector and electronics—and they also require excellent signal to noise ratio. With high quality electronics, the signal to noise ratio is mainly determined by the inherent Poisson statistics involved in the detection process. Detecting more photons will result in improved signal-to-noise-ratio, and, therefore, better spatial and timing resolution. No improvement in detector design and electronics can compensate for significant loss of light in the detection process. The fraction of the total amount of light collected (relative to the amount created in the scintillator) is a good measure of the efficiency of the design. So to maximize the amount of light collected, one would try to get the light sensor as close as possible to the scintillation crystal and avoid reflections and other edge effects. This would then force the arrangement to be large array detector with short distance between crystal and sensor.

As described above, a PET imaging system is more than just a counter. In addition to detecting the presence of a scintillation event, the system must identify its location. Conceptually, perhaps the most straightforward design to allow identification of the location of each interaction is to have a separate photosensor and data acquisition channel for each scintillator crystal. Due to constraints such as the physical size of common photosensors, the power required for each data acquisition channel, and the associated cost of these items, some form of multiplexing is usually used to reduce the number of photosensors and channels of electronics.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Embodiments described herein relate to a new method and apparatus to guide the maximum amount of light from the scintillation crystals to an array of photosensors.

In one embodiment, a positron emission tomography (PET) detector module, includes an array of scintillation crystal elements, a plurality of photosensors arranged to cover the array of crystal elements and configured to receive light emitted from the array of crystal elements, and a fiber optics plate arranged between the array of scintillation crystal elements and the plurality of photosensors, the fiber optics plate including a plurality of fibers configured to guide the light emitted from the scintillation crystal to the plurality of photosensors.

In another embodiment, a positron emission tomography scanner system, includes a plurality of detector modules arranged adjacent to one another to form a cylindrical detector ring, wherein each of the detector modules includes an array of scintillation crystal elements, a plurality of photosensors arranged to cover the array of crystal elements and configured to receive light emitted from the array of crystal elements, and a fiber optics plate arranged between the array of scintillation crystal elements and the plurality of photosensors, the fiber optics plate including a plurality of fibers configured to guide the light emitted from the scintillation crystal to the plurality of photosensors.

Figure 3:
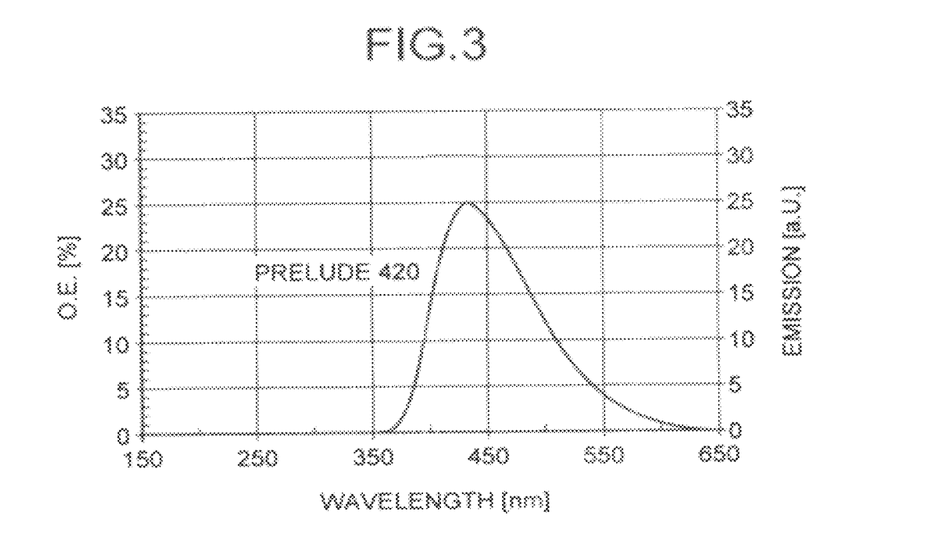
FIG. 3 illustrates the LYSO emission spectrum.

By properly documenting how light is being distributed to multiple light sensors, it is possible to assign an event location for any given set of sensor responses. Light therefore needs to be distributed to multiple sensors. With 32 photons per keV of gamma energy, a 511 keV gamma ray from the positron annihilation will produce an average of 16,352 photons with the spectrum shown in FIG. 3.

The spectrum is important when selecting optical materials to be used in the detector, particularly for the light guide. Material that has minimal absorption over the emission spectrum of the scintillator must be used to maximize the number of detected optical photons.

For imaging reasons, the crystal needs to be cut into small elements. The size of the crystal elements will be dictated by image resolution and count statistics, and a tacit industry standard of approximately 4×4 mm has emerged over the years. The length (or depth) of the crystal is dictated by the desired sensitivity. With an attenuation length of 12 mm (capturing 1/e of all the incoming gamma rays), 20 mm would capture around 80%, while 30 mm close to 90%.

Light will be created isotropically from the point of interaction, which can be located anywhere along the depth (e.g., 20 mm) of the crystal length according to an exponential probability distribution. The step of conveying the isotropic light from a single crystal to an array of light sensors is performed by the light guide. It is necessary to "properly" distribute the light to an array of photomultipliers in order to identify which crystal the light is most likely coming from. The PMT diameter or width will typically be between 6 to 10 times larger than the width of the crystal itself. By comparing the different amount of light received by each PMT, and by using a centroid (or center-of-mass or first order moment) calculation, one can create a map of all the crystals and ultimately relate the light received to a physical location in the crystal array, which is necessary for imaging. In order to form an X and Y centroid, light needs to be received by at least three PMTs, in a two-dimensional arrangement.

In the first approximation, the light guide is simply a neutral optical interface in which the light exiting the crystal elements would be open to all directions. Thickness can be adjusted so that the positioning (identification of the crystal) can be done. The edges of the array will need special attention.

Another factor influencing the light dispersion in the light guide is the index of refraction. The index of refraction of several materials currently used is around 1.5 (e.g. borosilicate glass, polycarbonate, Poly (Methyl Methacrylate) or PMMA), while LYSO is 1.81.

Figure 4:
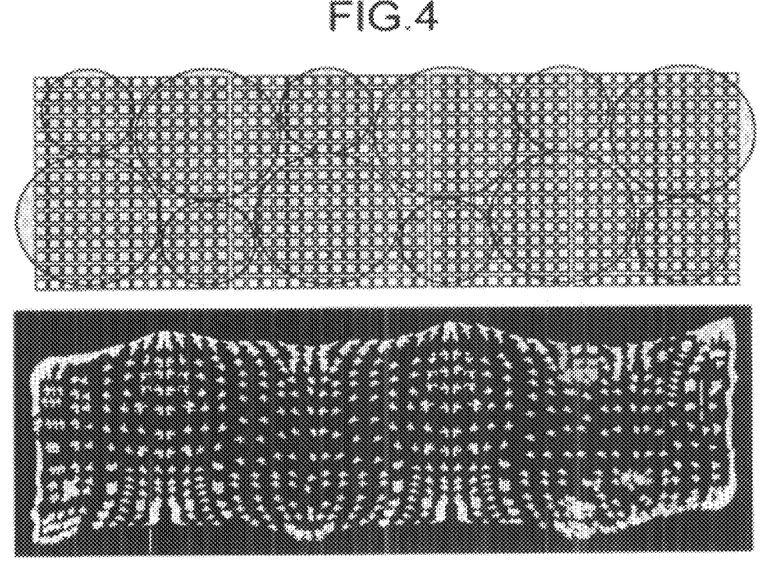
FIG. 4 illustrates a flood histogram showing the correspondence between each crystal of a detector and a given centroid.

When proper light distribution is obtained, one can reliably create a correspondence between each crystal of the detector and a single centroid, as shown in FIG. 4. With a passive optical material between the crystal array and the PMTs, such crystal identification would not be possible and it is necessary to add structure and reflection material in the natural path of the light to accomplish the proper distribution. This operation can be reduced to finding, for each crystal, the optimal (or minimal) ratio of light between all the surrounding PMTs. Any system that can repetitively produce the same distribution ratios would be a solution for this light guide function.

Conventional PET detectors provide multiple ways to properly carry light to the sensor array with enough spatial distribution that a simple centroid calculation would be sufficient to locate the crystal. However, the complex optical path reduces the total amount of light available for detection. Typically, conventional designs lose approximately 50 to 60% of the already very limited amount of light emitted from the scintillation crystal.

PET detection is limited by the limited number of photons of each event. Recovering a measurable fraction of the lost photons is significant in improving spatial, energy, and timing information associated with PET events.

Figure 1:
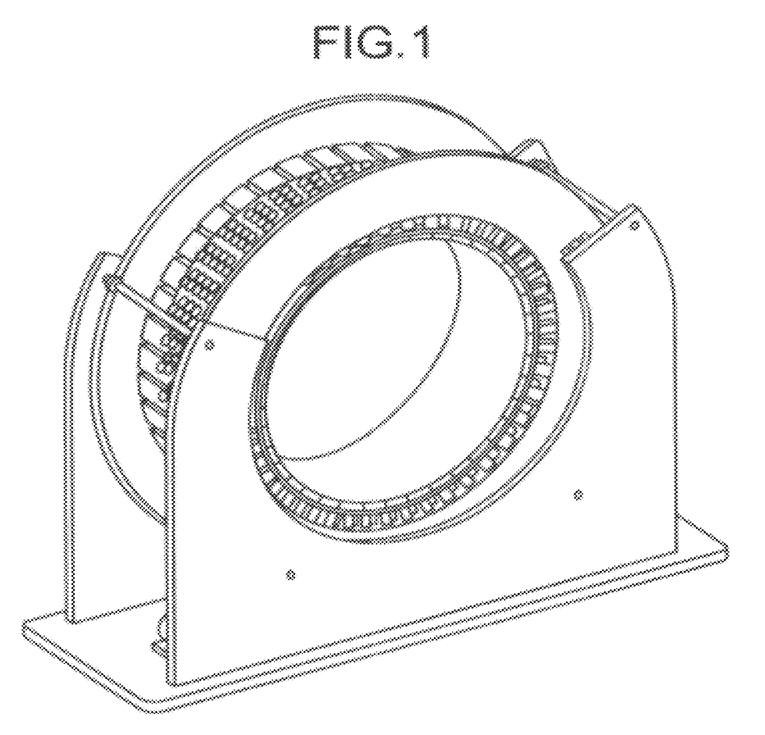
FIG. 1 illustrates a PET scanner ring having a plurality of detector modules.

Referring now to FIG. 1, a PET scanner design according to one embodiment. As shown in FIG. 1, a detector ring includes a number of rectangular detector modules. According to one embodiment, the detector ring includes 40 detector modules. In another embodiment, 36 modules are used to create a larger bore size for the scanner.

Figure 2:
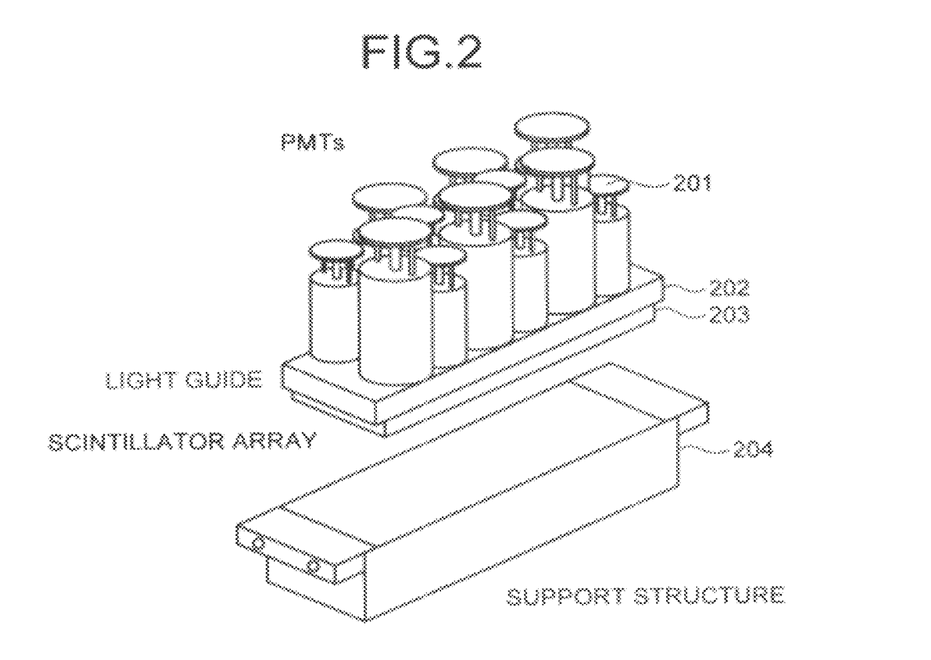
FIG. 2 illustrates one embodiment of a detector module, which includes a support structure, a scintillator array, a light guide, and an arrangement of PMTs.

FIG. 2 illustrates a detector module design that includes a support structure 204 and a two-dimensional array of individual detector crystals 203, which absorb the gamma radiation and emit scintillation photons, which are detected by the photomultiplier tubes. A light guide 202 is disposed between the array of detector crystals and the photomultiplier tubes (PMTs) 201. As shown in FIG. 2, each detector module includes a number of PMTs, of possibly various sizes, each of which covers a plurality of crystals. Each PMT produces an analog signal which rises sharply when a scintillation event occurs, and then tails off exponentially. The photons emitted from one detector crystal can be detected by more than one PMT. Then, based on the analog signal produced at each PMT, the detector crystal corresponding to an event can be determined.

Figure 7:
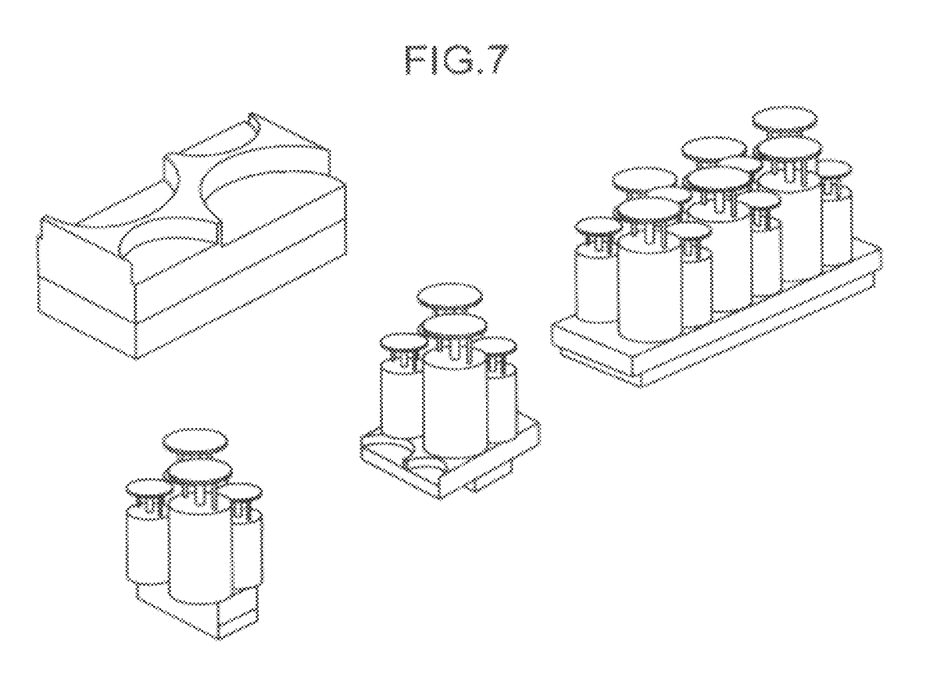
FIG. 7 illustrates a segmented design of the detector shown in FIG. 2.

FIG. 7 illustrates different views of a segmented detector module design. In one embodiment, the crystal array and light guide are segmented over the center line joining two PMTs. In the embodiment shown in FIG. 7, three types of segments are used, each segment including a crystal sub-array and a corresponding light guide sub-piece. One type of segment in this embodiment is an end-type segment, while the other types of segments are middle-type segments.

In one embodiment, a fiber optics faceplate is used as the light guide 202 to perform the light guide function in the PET detector shown in FIG. 2. The fiber optics plate is configured to guide the light emitted from the scintillation crystal to the plurality of photosensors in a thickness direction that is perpendicular to a longitudinal plane of the fiber optics plate. Further, a thickness of the fiber optics plate is substantially similar to a thickness of the array of scintillation crystal elements, as shown in FIGS. 2 and 7.

The fiber optics plate includes a large collection of fiber optics cores with optical material between them. When the fiber optics plate is arranged between the crystal array and the PMTs, a portion of the light is guided to the PMTs, even if the fiber has a curved path since the fiber assembly can be shaped in a complex form. The fraction of the light not getting inside the fiber due to location and angle of the fiber may still travel to the PMT in the neutral medium between the fibers.

In one embodiment, the density of the plurality of fibers within the fiber optics plate, i.e., the core/cladding ratio, is variable in a plane parallel to the fiber optics plate (or sensor plane). In another embodiment, the density of the plurality of fibers within the fiber optics plate varies from top side of the plate to the bottom side of the plate in a direction parallel to the long axis of the fibers. In another embodiment, the density of the plurality of fibers within the fiber optics plate is variable both in a thickness direction of the fiber optics plate and in the plane of the fiber optics plate. In another embodiment, the fibers have different numerical apertures.

Figure 5:
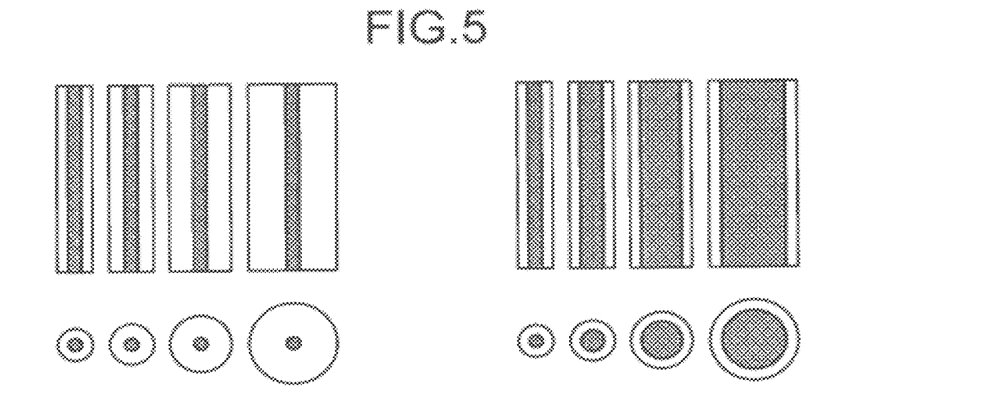
FIG. 5 illustrates various fiber optic fibers having different core/cladding ratios.

FIG. 5 illustrates two sets of fibers having different fiber densities that can be used in conjunction with embodiments disclosed herein. As shown in FIG. 5, the density can be changed by changing the fiber size for a given cladding thickness. Alternatively, a different cladding size can be used with a given fiber size to alter the density. Moreover, the cross-section of each fiber can be variable to alter the density in the thickness direction of the fiber-optics plate.

Figure 8A:
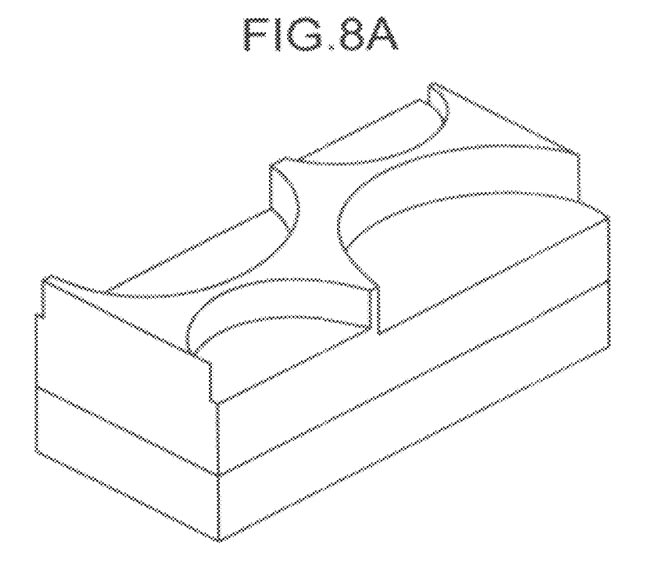
FIGS. 8A and 8B illustrates a segment of a light guide used in a segmented, non-fiber-optics design.
Figure 8B:
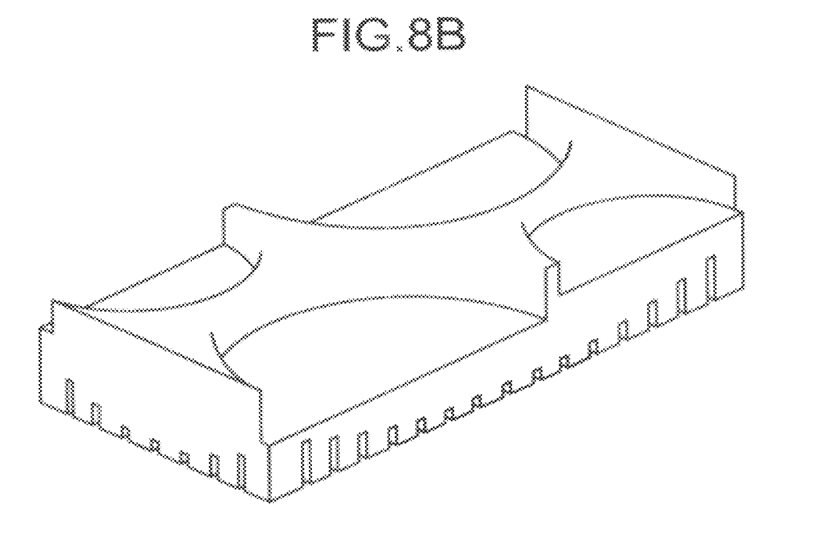

FIG. 8A shows a detail view of a segmented, non-fiber-optics crystal light-guide assembly. FIG. 8B shows a series of slots machined in the light-guide that receive reflector material, offering a variable guiding conduits from the crystal plane to the sensor plane. In this particular example, 3-5 different depths are required to obtain the desired distribution from the 128 individual crystals to the 4 sensors. Using this design, each crystal can be isolated, as in FIG. 4, where the multiple segments are connected together to form a module.

Figure 9:
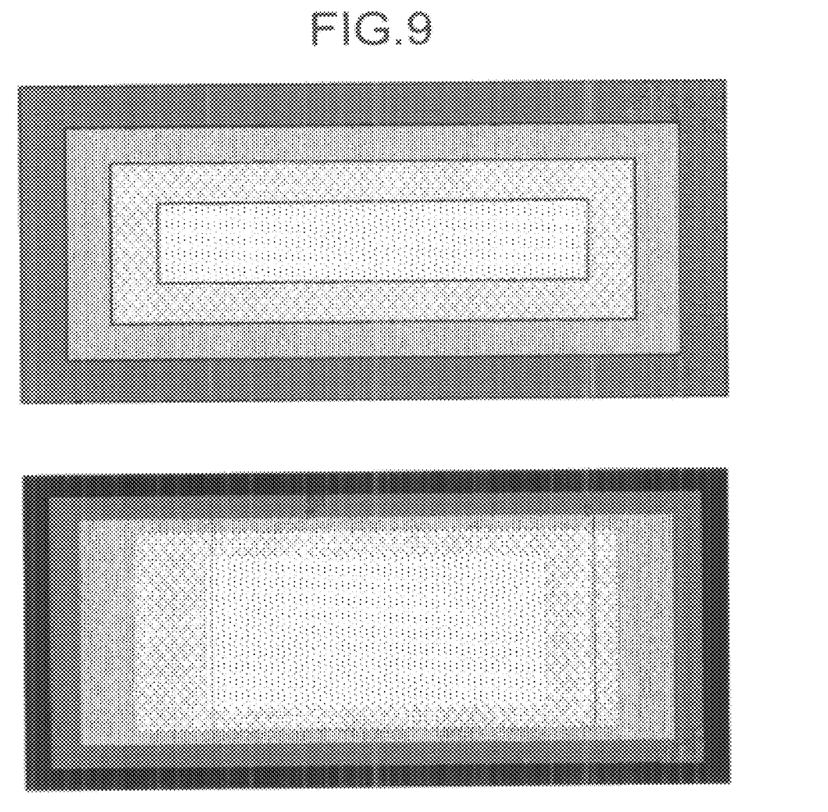
FIG. 9 illustrates two examples of variation in the fiber density of a light guide described herein, including step-wise variation within the light guide (top figure) and continuous variation with the light guide (bottom figure)

FIG. 9 shows how a fiber optics plate varies the amount of light guided in the core of the fiber, and the amount of light "free" to travel between the cores, in the cladding material. In the top case, the variation is step-wide with less guiding effect in the center of the plate and more guiding effect toward the edges, as in the machine PMMA case. The bottom part of FIG. 9 shows the same effect on a more continuous basis. Thus, by varying the core-clad ratio in the plane of the plate, a variable light guidance system is achieved.

Figure 10A:
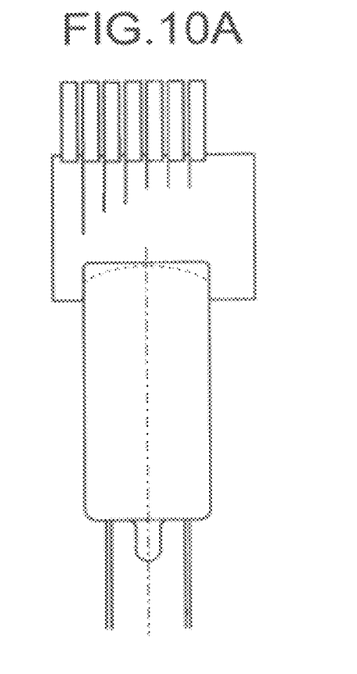
FIG. 10A illustrates a conventional crystal, light guide, photosensor combination.
Figure 10B:
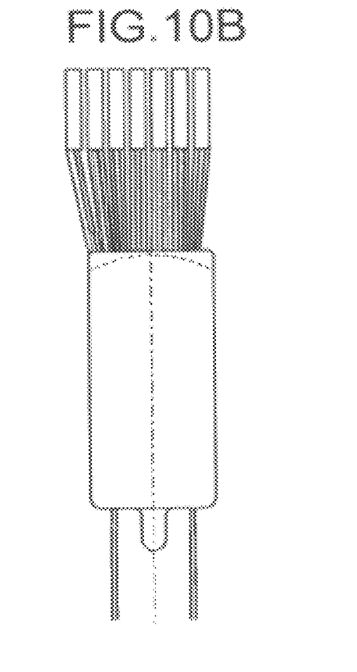
FIG. 10B illustrate a continuous variation in the density of fiber, providing light guidance to an active part of the photosensor sensor not possible with the design in FIG. 10A.

In this embodiment, the combined surface of the sensors is less that the total surface of the crystal. FIG. 10B shows how light guided inside the core of the fiber is directed toward the sensitive part of a sensor, instead of being directed, for example, between sensors, as in the non-fiber-optics design of FIG. 10A. By varying the density of fiber across the thickness of the plate in the proper area, the light is guided to the sensitive part of the sensor. In the embodiment of FIG. 10B, a density of the fibers in the fiber optics plate varies so as to direct the emitted light to a receiving surface of each of the plurality of photosensors and not direct light between the receiving surfaces of the photosensors.

It should be clear from the description of this embodiment that varying the density of fibers in both the light guide plane and within the thickness of the fiber optics plate, one can accomplish the proper distribution of light from one crystal to multiple sensors, as well as bringing more total light to the sensors by re-directing light that would end up between sensors in conventional detector designs.

The disclosed embodiments have several advantages. First, building the light guide from fiber optics plates is less expensive since it avoids all the machining and manual operation related to arranging reflectors in the light guide.

Second, a more subtle light distribution can be accomplished, such as with edge or corner crystals. The fiber optics plate offers more variables to optimize light distribution. First, the light captured by the fiber will be directed exactly and only where the fiber ends, while the cladding material offers a more neutral optical path. By varying the relative density of the two components, the light distribution is controlled. For instance, light from edge or corner crystals needs to travel a longer path to get to the adjacent sensors, so the density of fiber in the lateral direction is lower toward the edges. Also, the crystal array is clearly rectangular and the sensors, in one embodiment, are circular. So, in order to bring the light from the corner of the crystal array to a sensitive area on the photo-sensor, a wedge is created by varying the density of fibers depthwise from the crystal surface to the sensor plane. Similarly, the individual numerical aperture of the fiber, which is related to its index of refraction with respect to the cladding material, is used to control the amount of light getting in the fibers and is also used to control the ratio of the light guided by the fibers and propagated between the fibers.

A third advantage is an increase in the amount of light reaching the PMTs. The total amount of light to the PMTs increases due to the higher index of refraction of the core of the fiber (matching better the index of the crystal) and due to the decreased thickness of the neutral material, which is rendered possible by achieving the same light distribution in a shorter distance.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A fiber optics plate, comprising:
   a plurality of fibers, wherein the density of the plurality of fibers within the fiber optics plate varies in a longitudinal plane of the fiber optics plate that is perpendicular to the long axis of the fibers, and the density of the fibers decreases toward a center of the fiber optics plate so that a guiding effect is less toward the center of the fiber optics plate, wherein the plurality of fibers are configured to receive uniform light and to output non-uniform light.

2. The fiber optics plate of claim 1, wherein, for a same clad thickness, a core size of the fibers varies in the longitudinal plane of the fiber optics plate.

3. The fiber optics plate of claim 2, wherein, for a same core size, the cladding thickness of the fibers varies in the longitudinal plane of the fiber optics plate.

4. The fiber optics plate of claim 1, wherein, for a same core size, a cladding thickness of the fibers varies in the longitudinal plane of the fiber optics plate.

5. The fiber optics plate of claim 1, wherein a longitudinal cross-section of the fiber optics plate is a rectangle and the density of the fibers decreases in a step-wise manner toward the center of the rectangle.

6. The fiber optics plate of claim 1, wherein a longitudinal cross-section of the fiber optics plate is a rectangle and the density of the fibers decreases in a continuous manner toward the center of the rectangle.

7. A fiber optics plate, comprising:
   a plurality of fibers, wherein the density of the plurality of fibers within the fiber optics plate varies in a longitudinal plane of the fiber optics plate that is perpendicular to the long axis of the fibers, and the density of the fibers decreases toward a center of the fiber optics plate so that a guiding effect is less toward the center of the fiber optics plate,
   wherein a core size of the fibers varies in the longitudinal plane of the fiber optics plate while the clad thickness remains the same.

8. A detector, comprising:
   a scintillation crystal element;
   photosensors arranged non-uniformly with respect to the scintillation crystal element; and
   a fiber optics plate including a plurality of fibers, wherein the density of the plurality of fibers within the fiber optics plate, which guides light from the scintillation crystal element to the photosensors, varies in a longitudinal plane of the fiber optics plate that is perpendicular to the long axis of the fibers, and the density of the fibers decreases toward a center of the fiber optics plate so that a guiding effect is less toward the center of the fiber optics plate,
   wherein the plurality of fibers are configured to receive uniform light from the scintillation crystal element and to output non-uniform light to the photosensors.

* * * * *